US011716305B2

(12) United States Patent
Nainar et al.

(10) Patent No.: US 11,716,305 B2
(45) Date of Patent: Aug. 1, 2023

(54) CONTROL EMBEDDED DATA PACKET FOR EFFICIENT ARP QUERY IN SDA ENVIRONMENT

(71) Applicant: Cisco Technology Inc., San Jose, CA (US)

(72) Inventors: Nagendra Kumar Nainar, Morrisville, NC (US); Rahul Rammanohar, Bangalore (IN); Kondaveeti Lakshmi Ganesh, Andhra Pradesh (IN); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/361,647

(22) Filed: Jun. 29, 2021

(65) Prior Publication Data

US 2022/0417205 A1    Dec. 29, 2022

(51) Int. Cl.
*H04L 61/103* (2022.01)
*H04L 45/745* (2022.01)
*H04L 101/622* (2022.01)

(52) U.S. Cl.
CPC .......... *H04L 61/103* (2013.01); *H04L 45/745* (2013.01); *H04L 2101/622* (2022.05)

(58) Field of Classification Search
CPC ................. H04L 61/103; H04L 45/745; H04L 2101/622
See application file for complete search history.

(56) References Cited

U.S. PATENT DOCUMENTS

| 9,276,871 | B1* | 3/2016 | Freitas | H04L 61/103 |
| 2013/0311663 | A1* | 11/2013 | Kamath | H04L 12/4633 709/227 |
| 2014/0112349 | A1* | 4/2014 | Moreno | H04L 45/64 370/400 |
| 2017/0317919 | A1* | 11/2017 | Fernando | H04L 41/40 |

(Continued)

FOREIGN PATENT DOCUMENTS

| CN | 108123943 B | * | 11/2020 | ......... H04L 12/4641 |
| KR | 20160114401 A | * | 10/2016 | |
| WO | WO-2011006375 A1 | * | 1/2011 | ............. H04L 45/04 |

OTHER PUBLICATIONS

Doanh K. Luong et al., "*Seamless Handover in SDN-Based Future Avionics Networks with Network Coding and LISP Mobility Protocol*," Authorized licensed use limited to: University of Wollongong, IEEE Xplore, Sep. 30, 2019.

*Primary Examiner* — Saad A. Waqas
(74) *Attorney, Agent, or Firm* — Baker Botts L.L.P.

(57) ABSTRACT

The present disclosure is directed systems and methods for control embedding data packets for ARP queries, the methods including the steps of receiving a data plane packet from a first user device, the data plane packet requesting a hardware address associated with a second user device; generating a northbound control plane packet for transmission to a control plane node, the northbound control plane packet for requesting from the control plane node the hardware address associated with the second user device; embedding the data plane packet in the northbound control plane packet; and forwarding the northbound control plane packet with the data plane packet to the control plane node for respective processing of the northbound control plane packet and the data plane packet.

15 Claims, 4 Drawing Sheets

(56) References Cited

U.S. PATENT DOCUMENTS

| | | |
|---|---|---|
| 2018/0013674 A1 | 1/2018 | Nainar et al. |
| 2018/0167313 A1 | 6/2018 | Qiao et al. |
| 2018/0183678 A1 | 6/2018 | Rao et al. |
| 2021/0029029 A1 | 1/2021 | Mehmedagic et al. |
| 2021/0044565 A1* | 2/2021 | Moreno ................ H04L 45/586 |

* cited by examiner

CONTROL EMBEDDED DATA PACKET FOR EFFICIENT ARP QUERY IN SDA ENVIRONMENT

TECHNICAL FIELD

The present disclosure generally relates to Address Resolution Protocol (ARP) queries, and more specifically to a control embedded data packets for efficient ARP queries in a Software-Defined Access (SDA) environment.

BACKGROUND

Most computer programs and applications use a logical address (IP address) to send and receive messages with other devices. However, the actual communication occurs over the physical or hardware address (e.g., MAC address). Address Resolution Protocol (ARP) enables communication between devices in a local network by reconstructing or translating the IP address of an interface to a hardware address. Software-defined access (SDA) enables the use of overlay networks to achieve an intent-based network. While SDA-based solutions may be used to address ARP functions through address table lookups, there are various inefficiencies.

DESCRIPTION OF EXAMPLE EMBODIMENTS

Overview

Figure 1A:
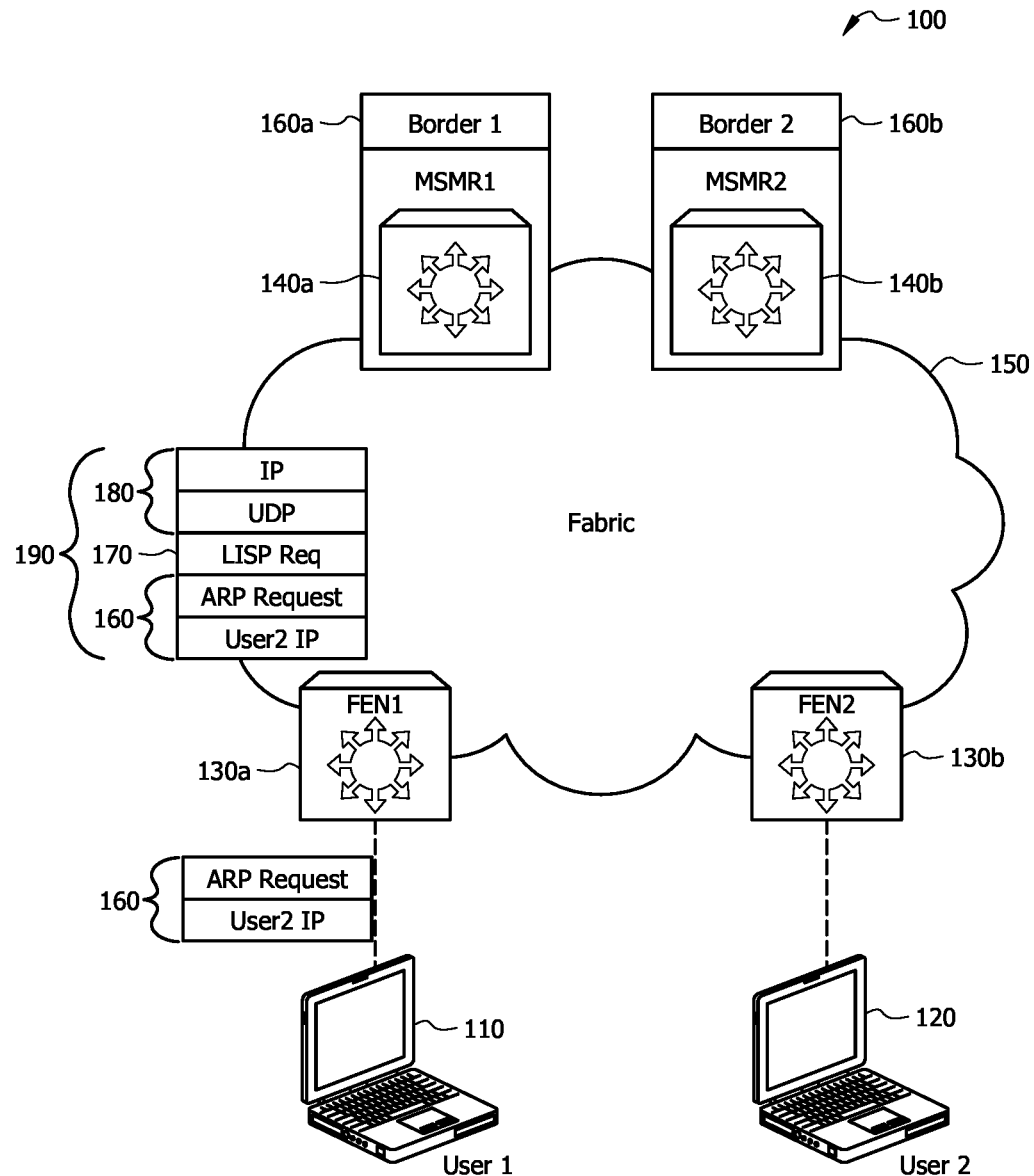
FIG. 1A illustrates a system for control embedded data packets for ARP queries, in accordance with certain embodiments.

According to an embodiment, a system may include one or more processors and one or more computer-readable non-transitory storage media comprising instructions that, when executed by the one or more processors, cause one or more components of the system to perform operations including, receiving a data plane packet from a first user device, the data plane packet requesting a hardware address associated with a second user device; generating a northbound control plane packet for transmission to a control plane node, the northbound control plane packet for requesting information for populating a forwarding table with one or more entries associated with the second user device; embedding the data plane packet in the northbound control plane packet; and forwarding the northbound control plane packet with the data plane packet to the control plane node for respective processing of the northbound control plane packet and the data plane packet.

Moreover, data plane packet may comprise an Address Resolution Protocol (ARP) request. Also, the northbound control plane packet may comprise a LISP request.

Additionally, the control plane node may be capable of control plane functionality and data plane functionality.

Moreover, the operation of embedding may further comprise at least one of the following: embedding the data plane packet into a payload of the northbound control plane packet; embedding the data plane packet into an overlay header of the northbound control plane packet; or embedding the data plane packet into a shim header in the northbound control plane packet.

Additionally, the operations may further comprise receiving a control plane response from the control plane node, the control plane response providing the one or more entries associated with the second user device. Further, the operations may also comprise receiving a data plane response from an edge node associated with the second user device, the data plane response to facilitate establishing a communication between the first user device and the second user device.

According to another embodiment, a method may include the steps of receiving a data plane packet from a first user device, the data plane packet requesting a hardware address associated with a second user device; generating a northbound control plane packet for transmission to a control plane node, the northbound control plane packet for requesting information for populating a forwarding table with one or more entries associated with the second user device; embedding the data plane packet in the northbound control plane packet; and forwarding the northbound control plane packet with the data plane packet to the control plane node for respective processing of the northbound control plane packet and the data plane packet.

According to yet another embodiment, one or more computer-readable non-transitory storage media may embody instructions that, when executed by a processor, cause the performance of operations, including receiving a data plane packet from a first user device, the data plane packet requesting a hardware address associated with a second user device; generating a northbound control plane packet for transmission to a control plane node, the northbound control plane packet for requesting information for populating a forwarding table with one or more entries associated with the second user device; embedding the data plane packet in the northbound control plane packet; and forwarding the northbound control plane packet with the data plane packet to the control plane node for respective processing of the northbound control plane packet and the data plane packet.

Technical advantages of certain embodiments of this disclosure may include one or more of the following. The systems and methods described herein may allow for the embedding a data plane request, such as an ARP request, within a control plane packet for processing by a control plane node. The control plane node may be configured with control plane and data plane functionality to handle and/or process both control plane and data plane requests. The result reduces chattiness among network elements, rendering greater efficiency without adversely impacting user experience.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Address Resolution Protocol (ARP) is a communication protocol used for discovering the hardware address, such as a Media Access Control (MAC) address, associated with a given internet layer address, typically an IPv4 address. ARP may be used, for example, in scenarios where traffic is to be transmitted between two user devices connected over a fabric in a network, e.g., User Device 1 needs to send a packet to User Device 2. Through Domain Name System (DNS) or otherwise, User Device 1 may determine the IP address of User Device 2, but it also requires the MAC address of User Device 2. ARP may be used to obtain this information.

Conventionally, User Device 1 may send a data plane ARP request to its associated fabric edge node (e.g., first fabric edge node) to learn the MAC address of User Device 2. The first fabric edge node may perform a lookup of the IP address of User Device 2 on its local table entries, and if no corresponding entries are found, the fabric edge node may generate a control plane request, such as a Locator ID Separation Protocol (LISP) request, to a control plane node requesting the MAC address corresponding to the IP address of User Device 2. The control plane node may respond to the first fabric edge node with the MAC address for User Device 2, and upon its receipt, the first fabric edge node may send another request to the control pane node to obtain information related to the edge node associated with User Device 2. Once the control plane node responds with the details of the edge node associated with User Device 2, the first fabric edge node may encapsulate the ARP request with an overlay header using an encapsulation protocol, such as VxLAN, and transmit it to the edge node associated with User Device 2. The edge node may decapsulate the overlay header and flood the ARP request in the connected site for the User Device 2. The edge node may also perform the foregoing operations in reverse to obtain the details of the first fabric edge node and may also forward the ARP reply to the first fabric edge node, which may then forward the ARP reply to User Device 1. The chattiness of the foregoing process introduces inefficiencies that impact the native Layer 2 experience for end customers. Specifically, the current process for determining the remote location ID for IP/MAC requires multiple control plane message exchanges, causing delays in communication between the end points.

The present disclosure is directed to an embedded control plane concept that reduces chattiness without compromising the end user experience. More specifically, the present disclosure is directed to embedding a data plane request within a control plane packet for processing by a control plane node. The control plane node may be configured with control plane and data plane functionality to handle and/or process both control plane and data plane requests. The result is reduced chattiness between/among network elements, rendering a more efficient system, without adversely impacting user experience.

Figure 1B:
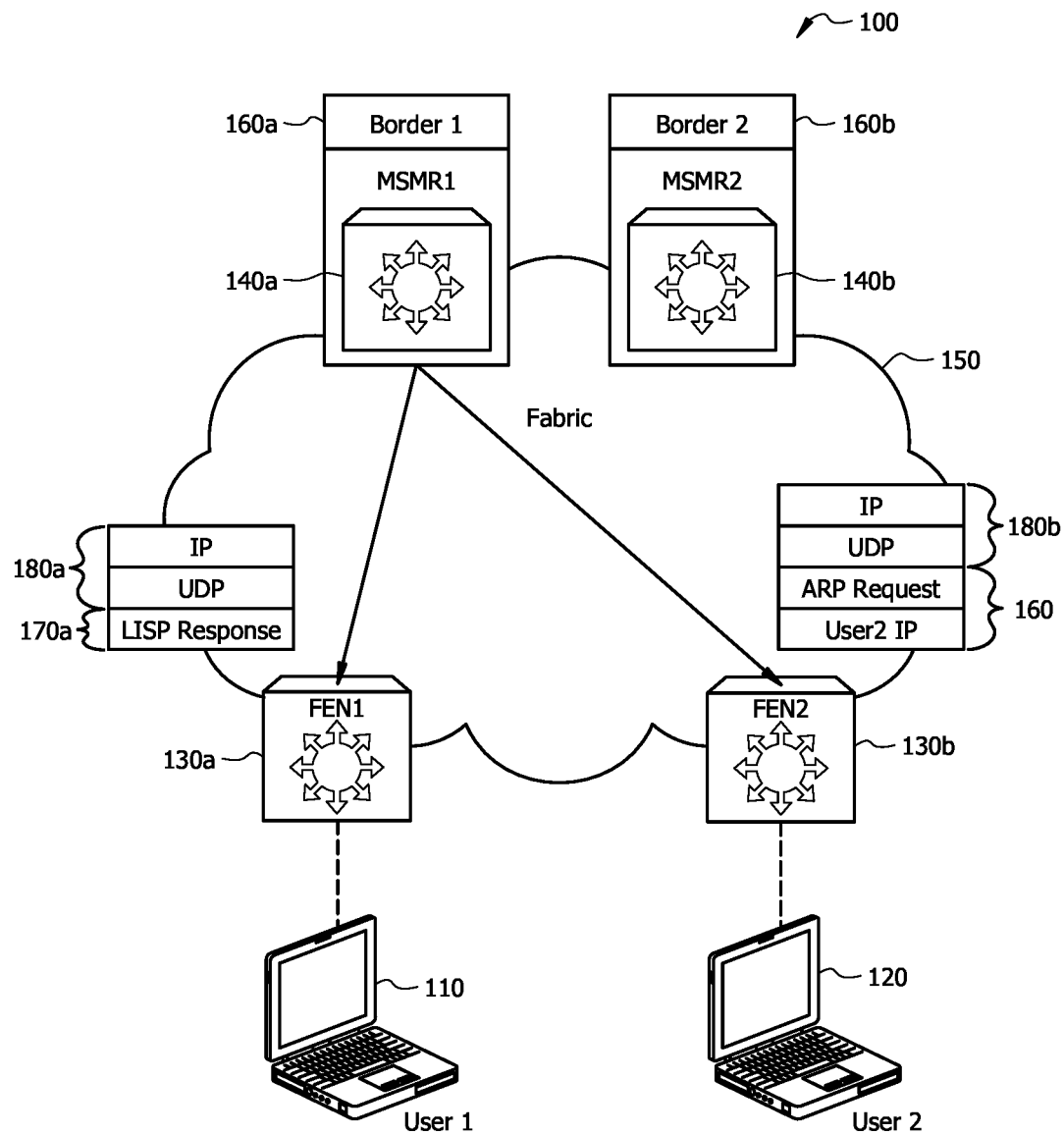
FIG. 1B further illustrates the system for control embedded data packets for ARP queries, in accordance with certain embodiments.

Reference is made to FIGS. 1A and 1B, wherein is depicted a system 100 for control embedding data packets for ARP queries, in accordance with the present disclosure. FIG. 1A illustrates the operation of system 100 at a fabric edge node, and FIG. 1B illustrates the operation of system 100 at a control plane node. System 100 may include a first user device 110 connected to or associated with a first fabric edge node 130a, and a second user device 120 connected to or associated with a second fabric edge node 130b. The first user device 110 and the second user device 120 are referred to in FIGS. 1A and 1B as "User 1" and "User 2", respectively. The first fabric edge node 130a and the second fabric edge node 130b are referred to in FIGS. 1A and 1B as "FEN1" and "FEN2", respectively. The first fabric edge node 130a and the second fabric edge node 130b may be communicatively connected over a Layer 3 or other fabric 150. In an embodiment, the first user device 110 and the second user device 120 may be part of the same Layer 2 network. The first fabric edge node 130a and the second fabric edge node 130b may be data plane entities, which are responsible to process and forward traffic.

System 100 may further include at least one control plane node 140a. The control plane node 140a is a control plane entity having centralized control plane intelligence. The control plane node 140a may be co-located with a border node 160a (referred to as Border1) and may include the functionality of a Map-Server and a Map-Resolver (together referred to as a "MSMR"). As understood in the art, a Map-Server is a mapping database that accepts registration requests associated with user devices from fabric edge nodes that serve as egress tunnel routers (ETRs). A Map-Resolver accepts encapsulated map request messages (requesting end user device identifiers) from fabric edge nodes that serve as ingress tunnel routers (ITRs), decapsulates those messages, and then forwards the messages to the Map-Server responsible for the egress tunnel routers that are associated with the requested end user device identifiers. In accordance with the present disclosure, the control plane node 140a may serve as a MSMR by registering information associated with any user device that onboards to the network and populating forwarding tables with information associated with onboarded user devices, so that traffic may be steered appropriately in the data plane. In accordance with the present disclosure, the border node 160a that is co-located with a control plane node 140a enables data plane functionality. As such, the control plane node 140a may include control plane functionality to process and respond to control plane packets, as well as some degree of data plane functionality to process data plane packets, as further described below. It is to be understood that, in some embodiments, the system 100 of the present disclosure may be adapted such that the border node 160a is not co-located with the control plane node 140a. For purposes of illustration, FIGS. 1A and 1B refer to the control plane node 140a as MSMR1. Because system 100 may include any number of control plane nodes with corresponding border nodes, a second control plane node 140b (referred to in FIGS. 1A and 1B as MSMR2) co-located with a second border node 160b (referred to in FIGS. 1A and 1B as Border2) is also shown. However, for simplicity, system 100 will be described in conjunction with a single control plane node 140a.

In terms of the operation of system 100, suppose the first user device 110 is called to forward certain traffic to the second user device 120 having a specified IP address. The first user device 110 may send a data plane request in the form of a data plane packet 160 to the first fabric edge node 130a, so that it may learn the hardware address (e.g., MAC address) associated with the IP address of the second user device 120. In an embodiment, and as shown in FIG. 1A, the data plane packet 160 may comprise an ARP request. The ARP request may include fields for indicating the IP address associated with the second user device 120 and requesting the hardware address of the second user device 120. Upon receiving the data plane packet 160 from the first user device 110, the first fabric edge node 130a may determine whether the hardware address associated with the second user device 120 is stored in its forwarding table.

If the hardware address of the second user device 120 is not stored in the forwarding table of the first fabric edge node 130a, the first fabric edge node 130a may generate a northbound control plane packet 170 for transmission to the control plane node 140a. The northbound control plane packet 170 may be configured to request information (i.e., the hardware address of the second user device 120, information regarding the fabric edge node 130b associated with the second user device 120) from the control plane node 140a so that the first fabric edge node 130a may populate its forwarding table accordingly. In an embodiment, the northbound control plane packet 170 may comprise a LISP control message configured to request mapping information for a user device. However, it is to be understood that the present disclosure is not intended to be limited to LISP messages and may comprise any north bound interface that may be transmitted toward a centralized control plane intelligence.

Upon creating the northbound control plane packet 170, the first fabric edge node 130a may then embed the data plane packet 160 into the northbound control plane packet 170. The data plane packet 160 may be embedded into the northbound control plane packet 170 in a number of ways. By way of example and not limitation, in one embodiment, the data plane packet 160 may be embedded into a payload of the northbound control plane packet 170. In another embodiment, data plane packet 160 may be embedded into an overlay header of the northbound control plane packet 170. In yet another embodiment, the data plane packet 160 may be embedded into a shim header, such as an In-situ Operations, Administration, and Maintenance (IOAM) header, that is added to the northbound control plane packet 170. In another embodiment, the shim header may be configured such that the data plane packet 160 is embedded inside the northbound control plane packet 170, or the northbound control plane packet 170 is embedded inside the data plane packet 160. Moreover, while the present disclosure describes that data plane packet 160 may comprise an ARP request and the northbound control plane packet 170 may comprise a LISP control message (and hence, that the ARP packet is embedded within a LISP packet), it is to be understood that the present disclosure is not to be limited in this manner, and may be adapted for other types of data plane packets and/or control plane packets.

The northbound control plane packet 170 and the embedded data plane packet 160 may be encapsulated by an outer header 180. The outer header 180 may include an IP header and/or a User Datagram Protocol (UDP) header, which may be encapsulated to steer the embedded packet to the control plane node 140a. The composite packet 190, comprising the northbound control plane packet 170, the embedded data plane packet 160, and the outer header 180, may be transmitted by the first fabric edge node 130a to the control plane node 140a.

In an embodiment, the first fabric edge node 130a may utilize any one of a number of mechanisms to indicate to the control plane node 140a that the northbound control plane packet 170 includes an embedded data plane packet 160. For example, the first fabric edge node 130a may configure and set a flag in the northbound control plane packet 170 that indicates the embedded data plane packet 160. In another example, the receipt of the incoming data plane packet 160 (from the first user device 110) may trigger the first fabric edge node 130a to generate a specific or differentiated type of northbound control plane packet 170 that, by configuration, would be understood by the control plane node 140a to indicate the existence of an embedded data plane packet 160.

Moreover, the manner in which the first fabric edge node 130a detects whether the control plane node 140a is capable of processing the northbound control plane packet 170 having the embedded data plane packet 160 may be based on a pre-configuration at the first fabric edge node 130a or pre-configuration at a controller (not shown). In an embodiment, the functionality of the control plane node may also be instantiated on virtual routers that are capable of forwarding packets based on table lookup.

As shown in FIG. 1B, once the composite packet 190 arrives at the control plane node 140a, the outer header 180 (shown in FIG. 1A) may be decapsulated and the northbound control plane packet 170 and the data plane packet 160 may be detached. The northbound control plane packet 170 may be handed to a module (not shown) of the control plane node 140a having control plane functionality for processing and generating a control plane response 170a. For example, where the northbound control plane packet 170 comprises a LISP request, the control plane node 140a may generate a LISP reply (as shown in the example of FIG. 1B). The control plane response 170a may be encapsulated by an outer header 180a and transmitted to the first fabric edge node 130a. The first fabric edge node 130a may receive the control plane response 170a from the control plane node 140a, the control plane response providing one or more entries associated with the second user device 120 and/or the edge associated with the second user device 120.

The data plane packet 160 may be handed to a module (not shown) of the control plane node 140a having data plane functionality for processing the data plane packet 160. Specifically, the control plane node 140a may perform a lookup to determine the appropriate fabric edge node associated with the second user device 120, i.e., the second fabric edge node 130b. The control plane node 140a may encapsulate the data plane packet 160 with an outer header 180b, and forward the same to the second fabric edge node 130b. For example, where the data plane packet 160 comprises an ARP request, the ARP request may be forwarded to the second fabric edge node 130b (as shown in the example of FIG. 1B).

The second fabric edge node 130b, upon receiving the data plane packet 160, may determine whether there is an entry in its local forwarding table to forward a response to the first user device 110. If there is no entry, the second fabric edge node 130b may perform similar operations (as described above with respect to the first fabric edge node 130a) to obtain necessary information associated with the first fabric edge node 130a to thereby transmit a data plane response (e.g., an ARP response) to the first fabric edge node 130a. Additional metadata, e.g., Security Group Tag (SGT), etc., may be included by the fabric edge nodes in the embedded packet to signal more granular details to the control plane node 140a. The first fabric edge node 130a may receive the data plane response from the second fabric edge node 130b associated with the second user device 120, the response to facilitate the communication between the first user device 110 and the second user device 120.

Figure 2:
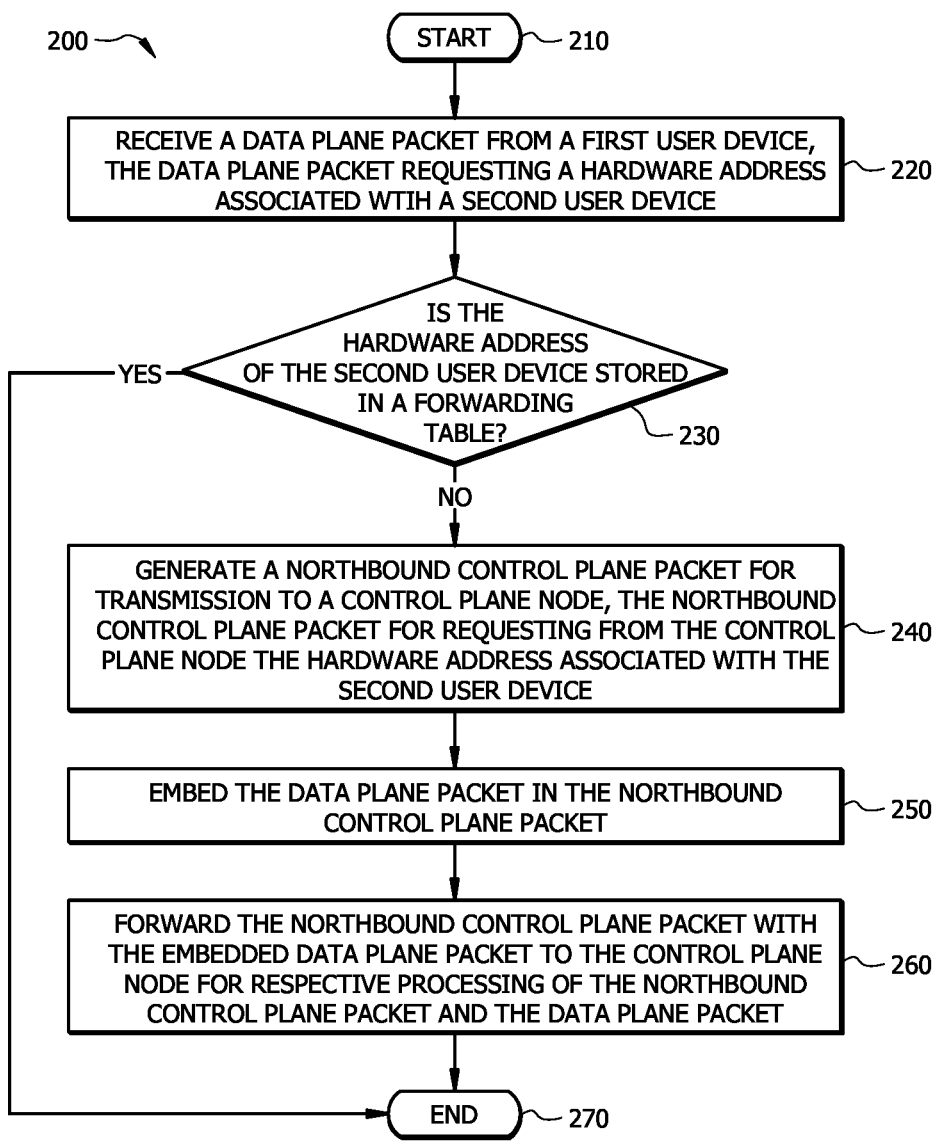
FIG. 2 illustrates a flow diagram of a method for control embedding data packets for ARP queries, in accordance with certain embodiments.

Reference is now made to FIG. 2, wherein is shown a flow diagram of a method for control embedding data packets for ARP queries, in accordance with the present disclosure. The steps of method 200 may be in accord with the operations outlined in conjunction with the system 100 of FIGS. 1A and 1B. As such, similar and corresponding terms described in conjunction with FIGS. 1A and 1B may have the same meaning when used in conjunction with the method 200 of FIG. 2. Additionally, the present disclosure incorporates by reference the description of FIGS. 1A and 1B for the purposes of explaining, expounding upon, or otherwise clarifying the steps of method 200.

Method 200 may be performed in a network having a plurality of fabric edge nodes, each fabric edge node having one or more associated user devices. For simplicity, method 200 will be described in conjunction with a first user device connected to or associated with a first fabric edge node, and a second user device connected to or associated with a second fabric edge node. The first fabric edge node and the second fabric edge node may be communicatively connected over a Layer 3 or other fabric. In an embodiment, the first user device and the second user device may be part of the same Layer 2 network. The first fabric edge node and the second fabric edge nodes may be data plane entities, which are responsible to process and forward traffic. The network may further include least one control plane node, which is a control plane entity having centralized control plane intelligence. The control plane node may be co-located with a border node, which may enable data plane functionality (such as packet forwarding) in the control plane. The control plane node may include the functionality of a Map-Server and a Map-Resolver (MSMR), as described above in conjunction with FIGS. 1A and 1B.

Method 200 presumes that the first user device is to forward traffic to the second user device having a specified IP address. The first user device may send a data plane request in the form of a data plane packet to the first fabric edge node, so that it may learn the hardware address (e.g., MAC address) associated with the IP address of the second user device.

In an embodiment, the steps of method 200 may be performed from the perspective of the first fabric edge node. However, it is to be understood that method 200 may be performed by any component, element, or module in the applicable multicast network, without departing from the spirit or scope of the present disclosure. The method 200 may begin at step 210. At step 220, the first fabric edge node may receive the data plane packet from a first user device, the data plane packet requesting a hardware address associated with a second user device. In an embodiment, and as shown in FIG. 1A, the data plane packet 160 may comprise an ARP request. The ARP request may include fields for indicating the IP address associated with the second user device and requesting the hardware address of the second user device.

At step 230, the first fabric edge node may determine whether the hardware address of the second user device is stored in a forwarding table associated with the first fabric edge node. If, at step 230, it is determined that the hardware address of the second user device is stored in a forwarding table, the first fabric edge node may provide the hardware address of the second user device to the first user device and the method may end at step 270. If, however, at step 230, it is determined that the hardware address of the second user device is not stored in a forwarding table, the method may proceed to step 240.

At step 240, the first fabric edge node may generate a northbound control plane packet for transmission to a control plane node, the northbound control plane packet for requesting from the control plane node the hardware address associated with the second user device, so that the first fabric edge node may populate its forwarding table accordingly. In an embodiment, the northbound control plane packet may comprise a LISP control message configured to request mapping information for a user device. However, it is to be understood that the present disclosure is not intended to be limited to LISP messages and may comprise any north bound interface that may be transmitted toward a centralized control plane intelligence.

At step 250, the first fabric edge node may embed the data plane packet in the northbound control plane packet. The data plane packet may be embedded into the northbound control plane packet in a number of ways. By way of example and not limitation, in one embodiment, the data plane packet may be embedded into a payload of the northbound control plane packet. In another embodiment, data plane packet may be embedded into an overlay header of the northbound control plane packet. In yet another embodiment, the data plane packet may be embedded into a shim header, such as an In-situ Operations, Administration, and Maintenance (IOAM) header, that is added to the northbound control plane packet. In another embodiment, the shim header may be configured such that the data plane packet is embedded inside the northbound control plane packet, or the northbound control plane packet is embedded inside the data plane packet. The fabric edge node may further encapsulate the northbound control plane packet and the embedded data plane packet by an outer header. The outer header may include an IP header and/or a UDP header, which may be encapsulated to steer the embedded packet to the control plane node.

In an embodiment, the first fabric edge node may utilize a mechanism to indicate to the control plane node that the northbound control plane packet includes an embedded data plane packet. For example, the first fabric edge node may configure and set a flag in the northbound control plane packet that indicates the embedded data plane packet. In another example, the receipt of the incoming data plane packet (from the first user device) may trigger the first fabric edge node to generate a specific or differentiated type of northbound control plane packet that, by configuration, would be understood by the control plane node to indicate the existence of an embedded data plane packet.

At step 260, the first fabric edge node may forward the northbound control plane packet with the data plane packet (including the encapsulated outer header) to the control plane node for respective processing by the control plane node of the northbound control plane packet and the data plane packet.

With respect to the control plane side, once the northbound control plane packet with the embedded data plane packet arrives at the control plane node, the control plane node may decapsulate the outer header and detach the northbound control plane packet and the data plane packet. The control plane functionality of the control plane node may process the northbound control plane packet and generate a control plane response. For example, where the northbound control plane packet comprises a LISP request, the control plane node may generate a LISP reply. The control plane response may be encapsulated by an outer header and transmitted to the first fabric edge node. The first fabric edge node may receive the control plane response from the control plane node, the control plane response providing one or more entries associated with the second user device and/or the edge associated with the second user device.

The data plane functionality (associated with the border node) of the control plane node may process the data plane packet. Specifically, the data plan functionality of the control plane node may perform a lookup to determine the appropriate fabric edge node associated with the second user device, i.e., the second fabric edge node. The control plane node may encapsulate the data plane packet with an outer header and forward the same to the second fabric edge node. For example, where the data plane packet comprises an ARP request, the ARP request may be forwarded to the second fabric edge node.

The second fabric edge node, upon receiving the data plane packet, may determine whether there is an entry in its local forwarding table to forward a response to the first user device. If there is no entry, the second fabric edge node may perform similar operations (as described above with respect to the first fabric edge node) to obtain necessary information associated with the first fabric edge node to thereby transmit a data plane response (e.g., an ARP response) to the first fabric edge node. The first fabric edge node may receive the data plane response from the second fabric edge node associated with the second user device, the response to facilitate the communication between the first user device and the second user device.

At step 270, the method may end.

In sum, the systems and methods of the present disclosure may allow for the embedding of a data plane request, such as an ARP request, within a control plane packet for processing by a control plane node. The control plane node may be configured with control plane and data plane functionality to handle and/or process both control plane and data plane requests. In effect, the mechanism of the present disclosure replaces four control plane transactions with one, thereby reducing chattiness among network elements and rendering greater efficiency without adversely impacting user experience. Further, the mechanism of the present disclosure may offer various performance improvements, e.g., by avoiding proxy-ARP/ND issues by directly delivering the packets between end hosts. The systems and methods of the present disclosure may be applicable in various contexts including, e.g., IPv4 ARP, IPv6 Neighbor Solicitation/Neighbor Advertisement (NS/NA), etc.

Figure 3:
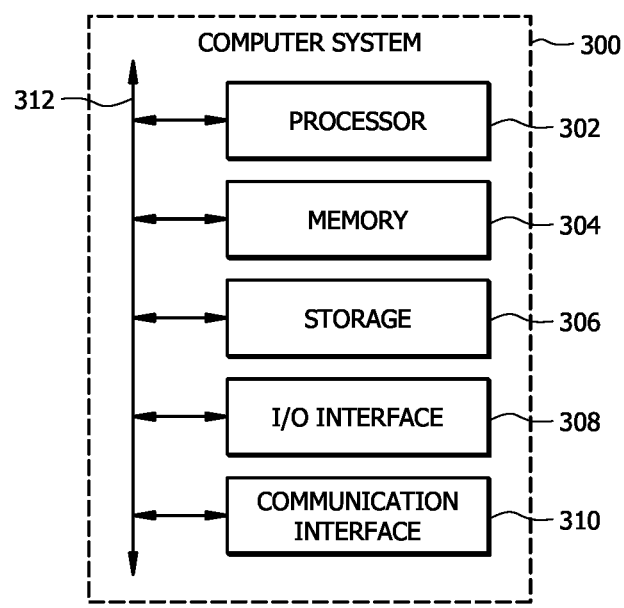
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors;
   one or more computer-readable non-transitory storage media comprising instructions that, when executed by the one or more processors, cause one or more components of the system to perform operations comprising:
   receiving a data plane packet from a first user device, wherein the data plane packet comprises an Address Resolution Protocol (ARP) request, the data plane packet requesting a Media Access Control (MAC) address associated with a second user device;
   generating a single northbound control plane packet for transmission to a control plane node, the single northbound control plane packet for requesting information for populating a forwarding table with one or more entries associated with the second user device, the single northbound control plane packet comprising a Locator ID Separation Protocol (LISP) request configured to request mapping information of the second user device;
   embedding the data plane packet in the single northbound control plane packet to generate a composite packet, the composite packet comprising the ARP request and the LISP request; and
   forwarding the composite packet to the control plane node, wherein the control plane node detaches the single northbound control plane packet from the data plane packet, and wherein the control plane node generates a control plane response and a data plane response.

2. The system of claim 1, wherein the control plane node is capable of control plane functionality and data plane functionality.

3. The system of claim 1, wherein the step of embedding further comprises at least one of the following:
   embedding the data plane packet into a payload of the single northbound control plane packet;
   embedding the data plane packet into an overlay header of the single northbound control plane packet; or
   embedding the data plane packet into a shim header in the single northbound control plane packet.

4. The system of claim 1, further comprising the operation of:
   receiving the control plane response from the control plane node, the control plane response providing the one or more entries associated with the second user device.

5. The system of claim 1, further comprising the operation of:
   receiving the data plane response from an edge node associated with the second user device, the data plane response to facilitate establishing a communication between the first user device and the second user device.

6. A method, comprising:
   receiving a data plane packet from a first user device, wherein the data plane packet comprises an Address Resolution Protocol (ARP) request, the data plane packet requesting a Media Access Control (MAC) address associated with a second user device;
   generating a single northbound control plane packet for transmission to a control plane node, the northbound control plane packet for requesting information for populating a forwarding table with one or more entries associated with the second user device, the single northbound control plane packet comprising a Locator ID Separation Protocol (LISP) request configured to request mapping information of the second user device;
   embedding the data plane packet in the single northbound control plane packet to generate a composite packet, the composite packet comprising the ARP request and the LISP request; and
   forwarding the composite packet to the control plane node, wherein the control plane node detaches the single northbound control plane packet from the data plane packet, and wherein the control plane node generates a control plane response and a data plane response.

7. The method of claim 6, wherein the control plane node is capable of control plane functionality and data plane functionality.

8. The method of claim 6, wherein the step of embedding further comprises at least one of the following:
   embedding the data plane packet into a payload of the single northbound control plane packet;
   embedding the data plane packet into an overlay header of the single northbound control plane packet; or
   embedding the data plane packet into a shim header in the single northbound control plane packet.

9. The method of claim 6, further comprising:
   receiving the control plane response from the control plane node, the control plane response providing the one or more entries associated with the second user device.

10. The method of claim 6, further comprising:
    receiving the data plane response from an edge node associated with the second user device, the data plane response to facilitate establishing a communication between the first user device and the second user device.

11. One or more computer-readable non-transitory storage media embodying instructions that, when executed by a processor, cause performance of operations comprising:
    receiving a data plane packet from a first user device, wherein the data plane packet comprises an Address Resolution Protocol (ARP) request, the data plane packet requesting a Media Access Control (MAC) address associated with a second user device;
    generating a single northbound control plane packet for transmission to a control plane node, the single northbound control plane packet for requesting information for populating a forwarding table with one or more entries associated with the second user device, the single northbound control plane packet comprising a Locator ID Separation Protocol (LISP) request configured to request mapping information of the second user device;
    embedding the data plane packet in the single northbound control plane packet to generate a composite packet, the composite packet comprising the ARP request and the LISP request; and
    forwarding the composite packet to the control plane node, wherein the control plane node detaches the single northbound control plane packet from the data plane packet, and wherein the control plane node generates a control plane response and a data plane response.

12. The one or more computer-readable non-transitory storage media of claim 11, wherein the control plane node is capable of control plane functionality and data plane functionality.

13. The one or more computer-readable non-transitory storage media of claim 11, wherein the step of embedding further comprises at least one of the following:
    embedding the data plane packet into a payload of the single northbound control plane packet;
    embedding the data plane packet into an overlay header of the single northbound control plane packet; or
    embedding the data plane packet into a shim header in the single northbound control plane packet.

14. The one or more computer-readable non-transitory storage media of claim 11, the operations further comprising:
    receiving the control plane response from the control plane node, the control plane response providing the one or more entries associated with the second user device.

15. The one or more computer-readable non-transitory storage media of claim 11, the operations further comprising:
    receiving the data plane response from an edge node associated with the second user device, the data plane response to facilitate establishing a communication between the first user device and the second user device.

* * * * *